United States Patent [19]

Wheatley, Jr.

[11] 4,331,414
[45] May 25, 1982

[54] LEAKPROOF STUD BOLT INCORPORATING MODIFIED THREAD

[76] Inventor: Thomas Wheatley, Jr., 2002 Roanwood, Houston, Tex. 77090

[21] Appl. No.: 149,048

[22] Filed: May 12, 1980

[51] Int. Cl.³ ............................................. F16B 39/30
[52] U.S. Cl. .................................... 411/311; 411/389
[58] Field of Search .............. 411/311, 310, 309, 308, 411/259, 277, 276, 389; 403/408

[56] References Cited

U.S. PATENT DOCUMENTS

| | | | |
|---|---|---|---|
| 1,106,342 | 8/1914 | Bristol | 411/389 |
| 2,084,146 | 6/1937 | Key | 411/389 |
| 2,352,540 | 6/1944 | Hanneman | 411/311 |
| 2,371,365 | 3/1945 | Tomalis et al. | 411/310 |
| 3,196,918 | 7/1965 | Hampton | 411/311 |
| 3,520,344 | 7/1970 | Gabbey | 411/310 |
| 3,664,400 | 5/1972 | Moore | 411/311 |
| 3,721,283 | 3/1973 | Evans | 411/310 |

Primary Examiner—Ramon S. Britts
Attorney, Agent, or Firm—Gunn, Lee & Jackson

[57] ABSTRACT

The preferred and illustrated embodiment of the present disclosure is directed to a stud bolt incorporating a thread preventing leakage along the thread of the tapped blind hole receiving the stud bolt wherein the thread is modified with a shallow root and a crown of increased width for at least one full turn.

5 Claims, 2 Drawing Figures

LEAKPROOF STUD BOLT INCORPORATING MODIFIED THREAD

BACKGROUND OF THE DISCLOSURE

Oil field valves and other fittings are constructed in cast bodies in most instances. The cast bodies are drilled with a number of blind holes at a flange face to enable connection of the flanged fitting into a pipeline or other mating apparatus. The connection is thus made through the use of headless stud bolts. Blind holes are drilled in the facing flange plate and are tapped with a thread to receive a headless stud bolt therein. The headless stud bolt is thus threaded into the tapped blind hole. Thereafter, the upper part of the bolt which incorporates a second threaded portion is utilized with a mating nut to attach a second flange plate to the first flange plate in completing the assembly of the equipment.

Two problems occur from time to time with this kind of construction. First of all, the headless stud bolt, typically comprised of a central unthreaded portion with threads at each end, is difficult to grasp and has a tendency to work loose and become unthreaded. It is difficult to grasp and thereby difficult to thread into the blind hole with the maximum permissible torque to prevent backing out. This can be cured in some measure through the utilization of split ring washers or an adhesive dope applied to the threads. While that will definitely reduce backing out, it is achieved with an increase in labor in assembly of the flange fittings together.

A second problem is leakage along the threads in the tapped blind hole. Often, hairline cracks will radiate to the end of the tapped blind hole from the interior of the casting. Depending on the vagaries of the path, the crack might well develop a means of leakage. The leaked material will then flow along the threads to escape from the fitting. This can be remedied in part by application of thread doping material to reduce communication along the threads. Again, this is achieved at notable added cost.

With these problems in view, the improved headless stud bolt of the present disclosure overcomes these problems by providing a modified thread with the stud bolt. A stud bolt constructed in accordance with these teachings can then be used with a conventionally formed tapped blind hole in a cast flange fitting. When installed in the tapped blind hole, the fitting is sealed against leakage along the threads. This is accomplished by modifying the last two or three turns of the thread. The thread that is formed on the headless stud bolt is defined by a crown which is the top edge. It is also defined by a root which is at the bottom or centered in the valley between adjacent threads. The crown is modified by increasing the width of the crown by at least one hundred percent for threads of usual manufacturing quality. The root is elevated relative to the thread, thereby positioning the root at a point where it jams against the mating crown of the blind hole thread. This nearly creates an interference fit when the last turns of the stud bolt are mated on installation. The crown of increased width jams against the more narrow root of the tapped hole to initiate an interference fit. The raised root also jams, and this jamming occurs preferably for at least one full turn around the stud bolt.

The foregoing described structure has another feature in that it locks the stud bolt in position to thereby prevent unintended backing out. Vibrations over a long period of time may very well back out headless, threaded stud bolts from a tapped blind hole. The interference fit achieved in the last two or three turns prevents backing out.

One advantage of this apparatus is that it can be machined on a conventional thread cutting machine which is characterized as a lathe having a cutting point traveling on a lead screw to thereby form the thread at the desired depth and pitch. While automated machinery may be used to form bolts in quantity, the machine, itself, is not modified and can be used in the intended manner.

In fabrication of the headless stud bolt of this disclosure, the thread end of the bolt to be received in the tapped blind hole is cut in the customary manner, except that the tool point is slightly withdrawn in forming the last two or three turns of the thread. The net result is that the conventional bar stock material used to form the stud bolt is cut in the conventional fashion to the outer cylindrical wall wherein withdrawal of the cutting tool defines the crown to a greater width. The increased width is obtained by the uniform withdrawl of the cutting tool. The same is true of formation of the root at the last two or three turns.

With the foregoing in mind, the apparatus is thereby summarized to incorporate a modified thread which includes about two turns wherein the last two turns which mate with the tapped blind hole are cut with an increased width on the crown and a raised root. The pitch of the thread otherwise remains the same. The crown of increased width can be conveniently obtained by slightly retracting the cutting tool and forming the thread so that the outer surface of the bar stock forms the widened crown.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE PREFERRED EMBODIMENT

Figure 1:
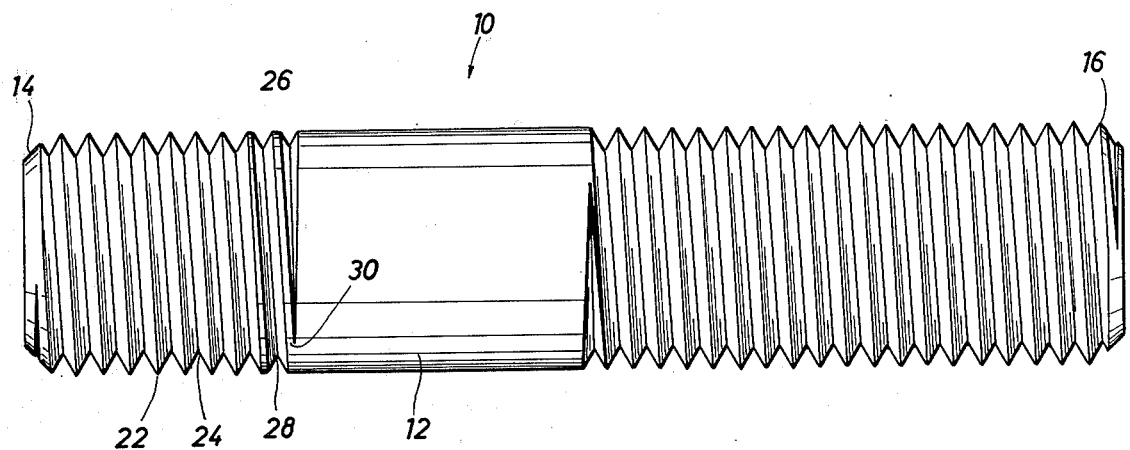
FIG. 1 is a side view of the headless stud bolt of the present invention showing a central unthreaded portion with threads formed at each end thereof.

Attention is first directed to FIG. 1 of the drawings where the numeral 10 identifies a headless stud bolt constructed in accordance with this disclosure. The bolt 10 has a central unthreaded portion 12. The blank portion 12 has the same diameter as the cylindrical stock which is used to fabricate the present apparatus. Ordinarily, it comes in standard or nominal diameters, and there is no virtue in cutting the bar stock at the cylindrical portion 12 to a smaller diameter. Rather, the stud bolt diameter matches the bar stock diameter so that the portion 12 need not be cut or otherwise machined to form a portion of reduced diameter in comparison with the bar stock diameter.

The stud bolt is defined to a specified length. It has a conventional set of threads 14 and a second set of threads 16 at the opposite or right-hand end. FIG. 1 shows both sets of threads to have the same pitch. This is not actually required, but it is customary and more convenient at the time of manufacture to make this accommodation. The threads 14 are the threads of interest to this disclosure. The threads 16 are formed at a specified pitch, machined to a required grade or quality of finish and extend for a specified length along the bolt 10. They are the threads which are exposed after the stud bolt 10 has been installed, to wit, the threads which receive a nut 20 shown in FIG. 2 for making the threaded connection complete.

Directing attention to the thread 14, it will be observed that this thread is constructed with a conventional pitch applied to the full length of the thread. The thread is formed to define a profile in accordance with industry standards. For instance, the thread can be National coarse, National fine or other known thread profiles. The profile of the thread includes, by way of definition, a crown 22 which is the outer edge, and, in the illustrated embodiment, the crown defines a relatively sharp edge along the thread. The crown 22 extends outwardly to the diameter of the bar stock used in fabrication of the bolt. This is a convenience in many instances and is cost efficient inasmuch as the amount of metal which is cut from the bar stock to form the thread is reduced to a minimum. The crown is, therefore, machined to the profile required for the type of thread, the most common being National thread.

The valley between adjacent threads is defined as the root and is identified by the numeral 24. The root 24 is shaped to a required profile determined by the nature of the thread to be applied to the bolt 10. The National thread bolt shown in FIG. 1 is relatively easy to machine inasmuch as the root is cut by the tool point during fabrication to a specified depth whereupon the crown is formed simultaneously. As will be understood, two or three passes are typically required to cut the thread to the required depth and finish.

The thread 14 is modified from the normal definition of the thread. The modification in accordance with this disclosure is implemented by backing the tool point out while fabricating the thread 14 for the last two or three turns. As the tool point is backed out or away from the bar stock which is formed into the bolt 10, such movement increases the width of the crown. The crown is increased in width by about two hundred percent or more. This is particularly advantageous for National threads. It will be appreciated that the crown width increase might be different for other types of threads depending on the quality of the finish. The quality of the finish and the shape of threads are both factors which govern the increased width of the crown. The crown is preferably widened to the point that it assures nearly an interference fit in the root of the mating thread. The crown thus jams snugly against the mating thread to reduce leakage. In like fashion, the root 28 at the modified crown 26 is raised. The root must normally be cut to a specified depth depending on the definition of the thread and the quality of finish. In this instance, the thread root is raised to assure that it jams against the crown of the mating thread. It is raised by retracting the tool point at the time of cutting the thread. Moreover, the modified crown and root extends for about two revolutions. It will be observed that the modification is accomplished by linear retraction of the cutting point so that the crown is increased gradually, but steadily to a maximum width at 30. At 30, the thread terminates as full retraction of the cutting point is achieved. In that sense, the crown widens from the beginning point of the modification to the end 30. This assures that the cutting procedure required for fabrication of the bolt 10 is implemented relatively easily and, moreover, assures that the modified thread is incorporated for at least one revolution.

Figure 2:
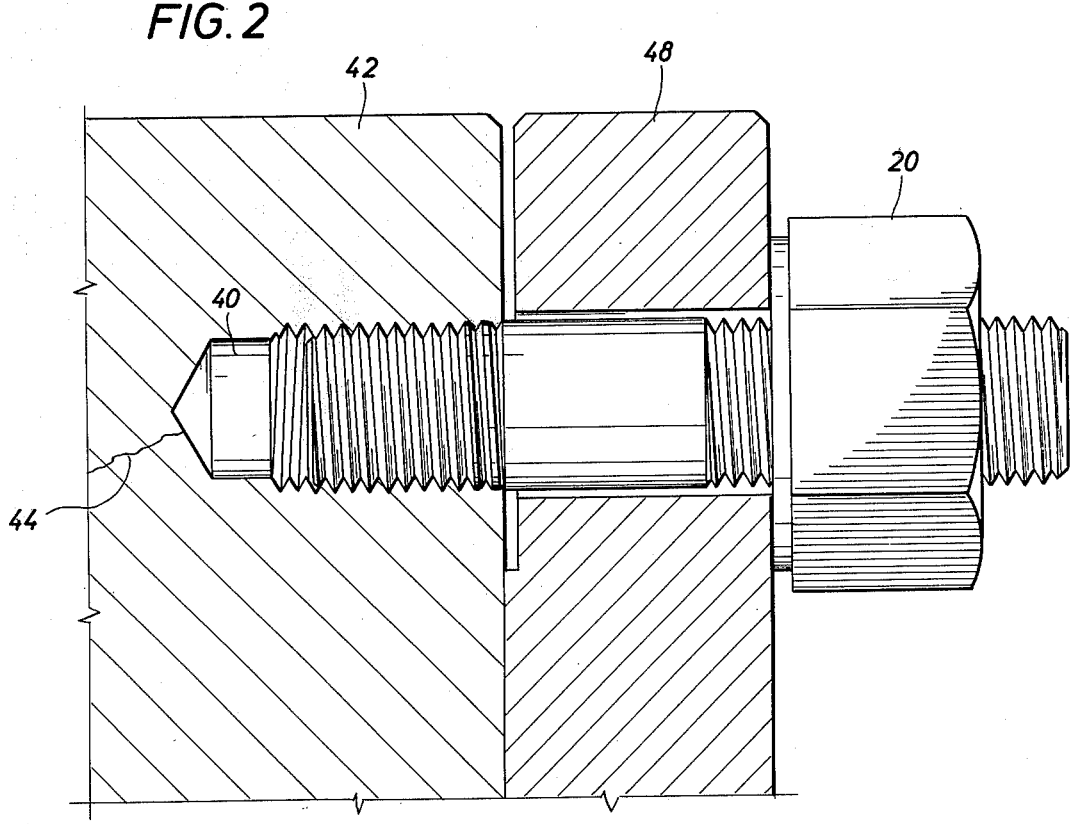
FIG. 2 is a view showing the stud bolt of the present invention threaded into a tapped blind hole in a cast flanged body which is bolted to a second flange plate.

FIG. 2 shows the headless stud bolt 10 threaded into a blind tapped hole 40 formed in a flange plate 42. The flange plate 42 is part of a valve or other body fabricated from a casting or the like. The casting is drilled to form the hole 40, and it is internally threaded. For purposes of illustration, assume that a casting fracture 44 runs from the drilled and tapped hole 40 to a cavity within the casting and comprises a leakage path. Leakage material flows through the passage 44 into the tapped hole 40. It can ordinarily leak along the threads to escape.

FIG. 2 illustrates a mating flange plate 48. The flange 48 includes large bolt holes on a bolt circle position to match the holes formed in the flange plate 42. The nut 20 is threaded to the stud bolt 10 to pull the flange plates together. The nut 20 is typically threaded to the thread 16, and a suitable torque is applied. The amount of torque is variable depending on the conditions of service for the flange plate connection.

In FIG. 2 of the drawings, the headless stud bolt 10 is installed as illustrated. After several months of installation, a conventional stud bolt may back out or become loosened. When this occurs, the flange plates may leak across their interface. The modified bolt of the present invention prevents this leakage. Once it is made tight, it holds in the tapped opening in a manner far superior to the hold previously accomplished. The modified thread anchors the bolt in a rather tenacious manner, rivalling that of a split ring lock washer.

The modification envisioned in the headless stud bolt 10 can be implemented with practically any type of thread and most diameters of bolt and on threads of practically all configurations. The extent of modification is in part dependent on the looseness of the fit which is, in turn, in part dependent on the quality of machining and the fineness of the threads. Accordingly, the extent of modification of the crown and root and the number of turns of modified thread in the bolt are subject to variation at least in part based on the foregoing factors. The optimum arrangement is a minimum of one turn of modified thread whereby leakage is prevented around the full circle. While it is true that leakage may very well occur flowing only in helical fashion along the threads, it is better to have a full revolution of modified thread. The optimum is about two turns. More threads than this incorporating the modifications taught herein are usually not required.

Preferably, the thread on the stud 10 is defined as American National or Unified Thread. One of the incorporated species of thread is coarse thread series, contrasted with fine thread series. Generally, these two series differ in the pitch of the thread. Accordingly, the thread is defined by a 60° thread angle. The crest has a minimum width of 0.125 times the pitch. The crest truncation is ideally flat but is normally rounded as tool point wear occurs in thread fabrication. This is particularly true with the crest of an external thread. As a generalization, it is not necessary to specify a root radius. Accordingly, FIG. 1 shows the root to be devoid of rounding or a root flat area.

The present invention modifies the crest from the specified crest truncation of 0.125 times the pitch to intermediate values as the tool point is pulled free. Ideally, at least one full revolution is cut at double the flat width or a flat width of 0.250 times the pitch for one turn or more. In like fashion, the flat at the root can be V-shaped to a typical width of about 0.125 times the pitch. In the modification of the present invention, at least one full turn with the flat at the root having a width of about 0.250 times the pitch is quite useful.

While the foregoing is directed to the preferred embodiment of the present invention, other and further embodiments of the invention may be devised without departing from the basic concept thereof, and the scope thereof is determined by the claims which follow.

I claim:

1. A modified stud bolt having an unthreaded central portion and a first thread formed one one end thereof adapted to be threaded into an internally tapped opening wherein the stud bolt has a second threaded portion extending from a second end thereof, said stud bolt further comprising an elongate bolt body of generally cylindrical construction wherein said first thread extends from the first end thereof, and said first thread comprises a plurality of thread turns with said thread turns being formed to a specified profile having a crown on each helical turn of thread and a root between adjacent helical turns of the thread wherein at least approximately one full turn of the thread has a modified crown wider than the profile of the remaining thread turns of said first thread which are in accordance with the standard defining said first thread and further including a root which root is raised with respect to the root of the remainder of the thread turns, and wherein said modified crown and raised root jam against the mating threads formed in a tapped hole and wherein said root at the raised portion thereof is increased to at least 0.25 times the pitch, and said root portion is adjacent to a thread having a widened crown and wherein said modified crown has a diameter equal to the diameter of the remaining thread turns.

2. The apparatus of claim 1 wherein said thread has a 60° thread angle.

3. The apparatus of claim 1 wherein said thread is formed in accordance with the standard of coarse thread series of the American National and Unified Thread and further wherein said widened crown increases from the standard crown width defined by the standard to a width at least double the standard width.

4. The apparatus of claim 1 wherein said modified thread crown, on threading, has an interference fit.

5. The apparatus of claim 1 wherein said modified thread root, on threading, has an interference fit.

* * * * *